United States Patent [19]
Hughett et al.

[11] Patent Number: 5,588,970
[45] Date of Patent: Dec. 31, 1996

[54] METHOD FOR VACUUM FILLING AND SEALING OF A BATTERY CELL

[76] Inventors: Elmer Hughett, Rte. 1, Box 151EC, Huntsville, Tenn. 37756; Richard B. Alexandres, 5193 Lakeview Dr., Clear Lake, Iowa 50428

[21] Appl. No.: 484,079

[22] Filed: Jun. 7, 1995

Related U.S. Application Data

[63] Continuation-in-part of Ser. No. 271,416, Jul. 6, 1994, Pat. No. 5,532,057.
[51] Int. Cl.$^6$ .............. H01M 2/04; H01M 2/36
[52] U.S. Cl. .............. 29/623.2; 141/8
[58] Field of Search .............. 429/53–56, 72, 429/94, 168–172, 223, 213, 194, 52; 141/5, 8, 11; 29/730, 731, 623.2, 623.5; 137/260

[56] References Cited

U.S. PATENT DOCUMENTS

| | | |
|---|---|---|
| 1,198,619 | 9/1916 | Clymer . |
| 2,382,675 | 8/1945 | Sutherland et al. . |
| 2,424,807 | 7/1947 | Eckman . |
| 2,452,049 | 10/1948 | Hauck . |
| 2,488,573 | 11/1949 | Wood . |
| 2,578,024 | 12/1951 | Steinmayer et al. . |
| 2,810,776 | 10/1957 | Brill et al. . |
| 3,748,186 | 7/1973 | Rosansky et al. . |
| 3,912,541 | 10/1975 | Britz et al. . |
| 4,006,281 | 2/1977 | Markin et al. . |
| 4,061,163 | 12/1977 | Decker et al. . |
| 4,091,181 | 5/1978 | Merritt, Jr. .............. 429/94 |
| 4,136,438 | 1/1979 | Mallory . |
| 4,289,176 | 9/1981 | Evans . |
| 4,350,185 | 9/1982 | Quist . |
| 4,476,202 | 10/1984 | Wesner . |
| 4,529,020 | 7/1985 | Hoover et al. . |
| 4,695,519 | 9/1987 | Rao et al. . |
| 5,079,108 | 1/1992 | Annen et al. .............. 429/171 |
| 5,171,647 | 12/1992 | Dean et al. .............. 429/54 |
| 5,201,924 | 4/1993 | Mix et al. . |
| 5,212,867 | 5/1993 | Vogel . |

FOREIGN PATENT DOCUMENTS

| | | |
|---|---|---|
| 256568 | 1/1987 | Germany . |
| 5624765 | 3/1981 | Japan . |
| 60-59654 | 4/1985 | Japan . |
| 60-246557 | 12/1985 | Japan . |
| 1193959 | 10/1967 | United Kingdom . |

*Primary Examiner*—Anthony Skapars

[57] ABSTRACT

A small battery cell including a pressure relief and spring disengagement device which vents various internal pressures to the atmosphere to prevent cell bulging or explosion, and also which internally interrupts current flow through the cell due to internal cell over heat, excessive current flow or the like. Internal reconnection of cell members reoccurs subsequent to internal thermal or other internal abnormalities. Alternate embodiments illustrate an apparatus and method for vacuum assisted filling and an apparatus for vacuum sealing of the small battery cell.

2 Claims, 10 Drawing Sheets

METHOD FOR VACUUM FILLING AND SEALING OF A BATTERY CELL

CROSS REFERENCES TO CO-PENDING APPLICATIONS

This application is a continuation-in-part of U.S. Ser. No. 08/271,416, filed on Jul. 06, 1994, now U.S. Pat. No. 5,532,057, entitled "Small Battery Cell" by the same inventors as the present invention.

BACKGROUND OF THE INVENTION

1. Field of the Invention

The present invention pertains to a battery cell, and more particularly, relates to a battery cell for use in electric devices. The battery cell includes internal safeguards such as automatic internal cell disengagement and re-engagement for cell pressure relief. The invention also pertains to an apparatus and method for vacuum assisted filling of the battery cells with an electrolyte and to the subsequent sealing of the cell.

2. Description of the Prior Art

The prior art cell devices have included tabs from the electrodes leading to and welded to the positive and negative end plates. When a cell would experience dramatic operating conditions such as overheating, overcurrent, or other abnormal operating conditions, the internal connections would often be displaced to the point of subsequently rendering the battery inoperative during these abnormal excursions due to internal member breakage and the inability to accommodate internal movement of member components.

Clearly what is needed is a cell which is forgiving of the prior art design flaws and which can accommodate such internal movement and fluctuations without rendering the cell totally useless.

The present invention provides such a cell having pressure relief by frangible structure and automatic cell disabling and re-enabling capabilities, which is filled under vacuum assistance and sealed under a vacuum.

SUMMARY OF THE INVENTION

The general purpose of the present invention is a small battery cell.

According to one aspect of the present invention, there is provided a small battery cell assembly including a central electrode aligned within a case member and including members which align to the top and to the bottom regions of the central electrode, and within or adjoining the battery cell case. Aligned above the electrode assembly are a positive current collector, a spring, a positive contact member and a frangible cover. Aligned below the electrode assembly is a negative current collector. A case surrounds the electrode assembly, and other members form a negative contact member. The spring member in the upper portion of the cell exerts pressure downwardly upon the positive current collector to engage the positive electrode of the cell. Expansion of internal members of the cell over comes spring tension to cause disengagement of the positive current collector with the positive electrode. Contraction of the internal members allows re-engagement by spring force. Pressure relief is provided for by a frangible cover located in the upper region of the cell.

Another aspect of the invention involves a method and apparatus for vacuum assisted electrolyte filling of the battery casing and for sealing of the battery casing under vacuum. Vacuum assisted filling provides for evacuation and reduction of air or gas pockets within the electrode assembly followed by low pressure assisted electrolyte placement into the cell casing. Vacuum sealing of the cell relies upon the qualities of vacuum to prevent outward leakage of electrolyte from the interior, i.e., the outside environment surrounding the battery casing is trying to, under the guise of high pressure, invade the interior of the cell instead of the contents of the battery cell trying to escape the confines of the battery cell, as in an ambient pressure sealed battery or overheated battery.

One significant aspect and feature of the present invention is a battery cell having a frangible cover.

Another significant aspect and feature of the present invention is an internal current interrupter which disengages the positive electrode from a positive current collector during a pressure event and re-engages after the event.

An additional significant aspect and feature of the present invention is a spring member forcing engagement or re-engagement of the positive electrode to a positive current collector.

Still another significant aspect and feature of the present invention is a positive and a negative current collector having V-projections for electrode contact.

Yet another significant aspect and feature of the present invention is a positive current collector which can move vertically within the battery case.

Another significant aspect and feature of the present invention is a method and apparatus for vacuum filling of electrolyte into a battery cell.

Another significant aspect and feature of the present invention is the application of a vacuum to a cell casing and resident electrode assembly to remove pockets of air or gases from the electrode assembly.

Another significant aspect and feature of the present invention is a positionable can seal body which, when vacuum is applied, moves to seal against a spherical seal.

Another significant aspect and feature of the present invention is low pressure (vacuum) assistance for filling of a cell casing with electrolyte.

Another significant aspect and feature of the present invention is a method and apparatus for the sealing of a battery cell under vacuum.

Another significant aspect and feature of the present invention is a sealing apparatus having a swaging insert which communicates a vacuum to the interior of a battery cell while the casing is held under vacuum during case sealing.

Having thus described aspects and features of the present invention, it is the principal object of the present invention to provide a small battery cell having internal spring safeguards and a frangible cover safeguard and to provide a process and apparatus for vacuum filling and sealing of a battery casing.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
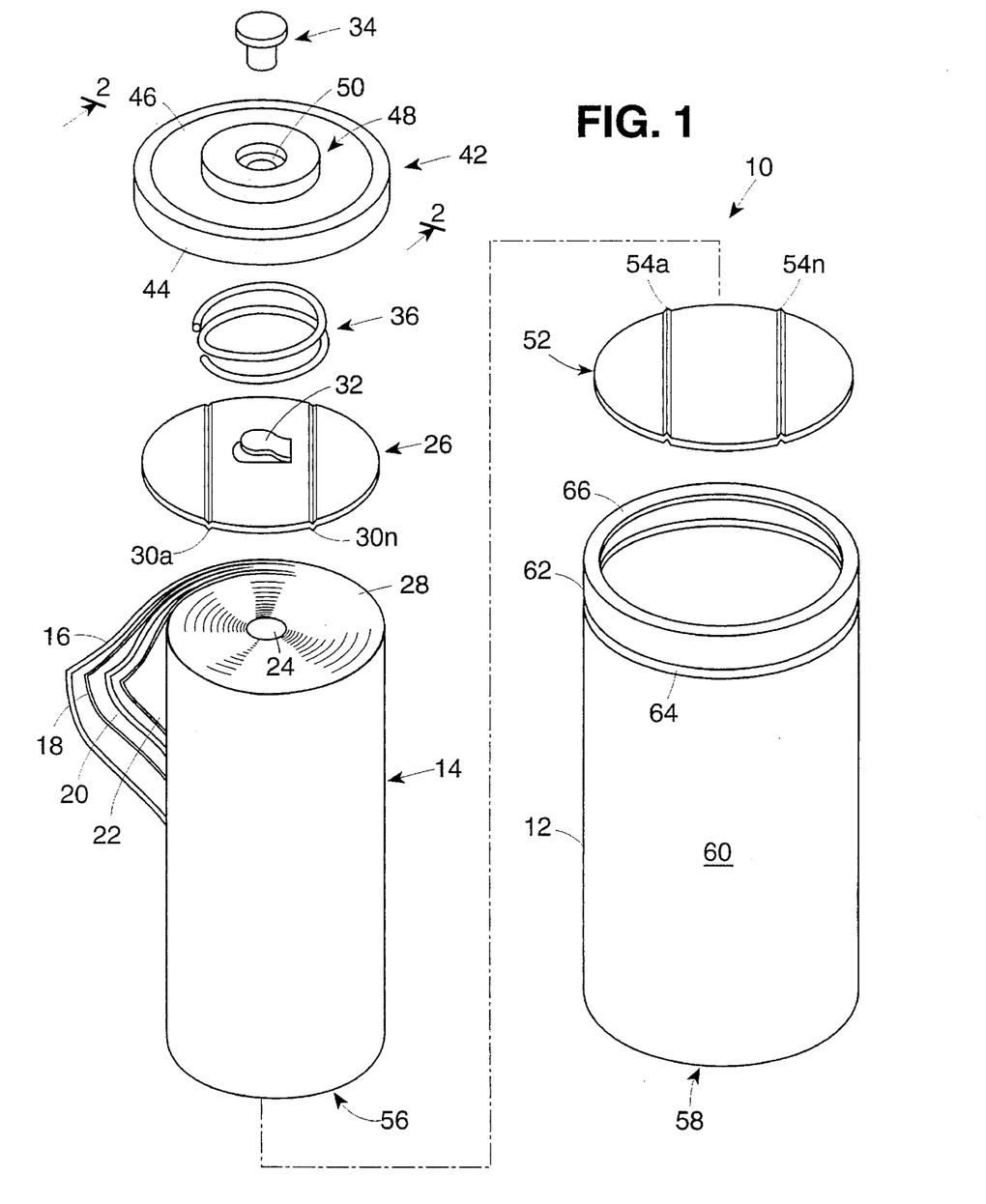
FIG. 1 is an exploded view of the small battery cell.
Figure 2:
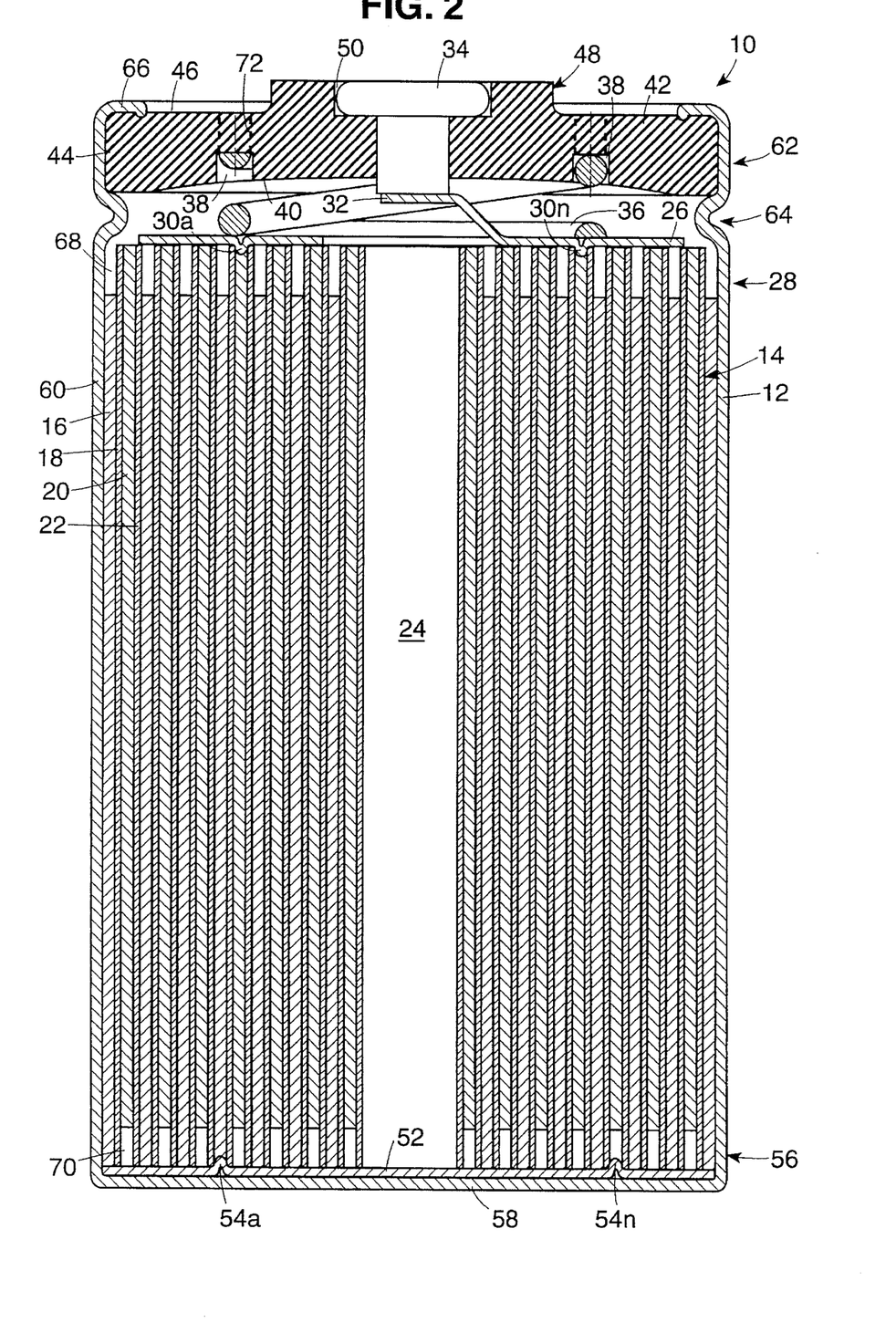
FIG. 2 is a cross-sectional view of the cell along line 2—2 of FIG. 1.

FIG. 1 is an exploded view of a small battery cell 10 including a plurality of component members which align in a casing member 12. Aligned centrally in the casing member 12 is spirally wound electrode assembly 14 having a negative electrode 16, a first separator 18, a positive electrode 20 and a second separator 22 arranged as a layer and continuously layered over and about itself in spiral fashion in ever increasing radius about a mandrel hole 24. The electrodes are offset in height with respect to each other. A circular and substantially planar positive current collector 26 aligns in intimate contact to the upper surface 28 of the electrode assembly 14 to physically and electrically contact the positive electrode 20 at a plurality of contact areas, as illustrated in FIG. 2. A plurality of downwardly extending V-projections 30a–30n contact the wound positive electrode 20 along and about the top edge of the upper surface 28. A spring tab 32 extends upwardly at an angle and then extends horizontally parallel to the plane of the positive current collector 26. The spring tab 32 mates and secures to the bottom side of a positive contact 34, as illustrated in FIG. 2. A spring 36 aligns over and about the spring tab 32 to effect intimate physical contact with the upper surface of the positive current collector 26 at the lower portion of the spring 36. The upper portion of the spring 36 intimately contacts and aligns in and is captured in an annular groove 38 in a dome surface 40 of a frangible cover seal 42. A representative battery seal is U.S. Pat. No. 5,057,386. Spring 36 forces the positive current collector 26 into physical and electrical contact with the positive electrode 20 in the spirally wound electrode assembly 14.

With reference also to FIG. 2, the frangible cover 42 is generally disk shaped including an edge 44, an upper planar surface 46, an integral but frangible donut like center section 48 extending vertically from the upper planar surface 46, a multi radius cavity 50 extending through the frangible center section 48, a lower domed surface 40 and the annular groove 38 in the dome surface 40.

Other components secure into the lower portion of the case 12 to effect a negative contact portion of the battery including, a disk-like negative current collector 52 having a plurality of upwardly extending V-projections 54a–54n for contact with the wound negative electrode 16 along and about the bottom edge of the electrode assembly lower surface 56.

The integral one piece electrically conducting case 12 houses the previously described components and includes a bottom 58, a round side 60, and an upper containment portion 62 formed over and about the edge 44 of the frangible disk 42 including an annular groove 64 and an upper annular surface 66 crimped into sealing engagement with the upper planar surface 46 of the frangible cover 42.

The battery cell can be nickel cadmium, nickel metal hydride, lithium ion, lithium polymer, or silver metal hydride with the appropriate electrolyte such as potassium hydroxide. Representative uses for the cell can include a cellular telephone or a radio transceiver.

FIG. 2 is a cross-sectional view of an assembled cell 10 along line 2—2 of FIG. 1 where all numerals correspond to those elements previously described. Illustrated in particular is the overall connection between the pluralities of positive and negative electrodes 20 and 16 to the associated positive and negative members of the cell 10. It is noted that the lengths of the positive and negative electrodes 20 and 16 are not of the same length as the interspersed first and second separators 18 and 22, and that a space 68 of ever changing spiral radius is provided over and above the top portion of the negative electrode 16. The positive electrode 20 extends upwardly beyond the height of the adjacent continued space 68, and between the upper regions of the first and second separators 18 and 22 where mutual physical and electrical contact with the V-projections 30a–30n of the positive current collector 26 is established. Contact of the V-projections 30a–30n of the positive current collector 26 with the negative electrode 16 is prevented in this region by the space 68 at the upper surface 28 of the electrode assembly 14. Spring tab 32 located on the positive current collector 26 extends upwardly and horizontally to align to and physically secure to and electrically connect to the underside of the positive contact member 34. The spring 36 aligns over and about the tab 32 and in the annular groove 38 on the underside of the dome surface 40 and the upper surface of the positive current collector 26 to exert downward pressure upon the positive current collector 26 to ensure contact of the V-projections 30a–30n with the positive electrode 20. Electrical current flow proceeds through the positive current collector 26, the spring tab 32, and the positive contact member 34.

Connection to the negative electrode 16 is accomplished in the lower region of the cell 10. A space 70 is provided over and below the bottom position of the positive electrode 20 much in the same position as for space 68 at the upper portion of the battery 10. The negative electrode 16 extends downwardly beyond the uppermost region of the adjacent continual space 70, and between the lower regions of the first and second separators 18 and 22 where mutual physical and electrical contact with the V-projections 54a–54n of the negative current collector 52 is established. Contact of the V-projections 54a–54n with the positive current electrode 20 is prevented in this region by the continual space 70 at the lower surface 56 of the electrode assembly 14. The negative current collector 52 is in intimate physical contact and electrical contact with the bottom 58 of the case 12 which is the negative contact member.

Frangibility of the frangible cover 42 is provided for by a thin annular frangible area 72 designated by heavy dashed black lines between the annular groove 38 and the upper planar surface 46. Should excessive internal pressures occur, the frangible cover 42 separates along the thin frangible annular area 72 to prevent excessive internal pressure build-up thereby preventing all explosive or other such catastrophic events.

MODE OF OPERATION

Figure 3:
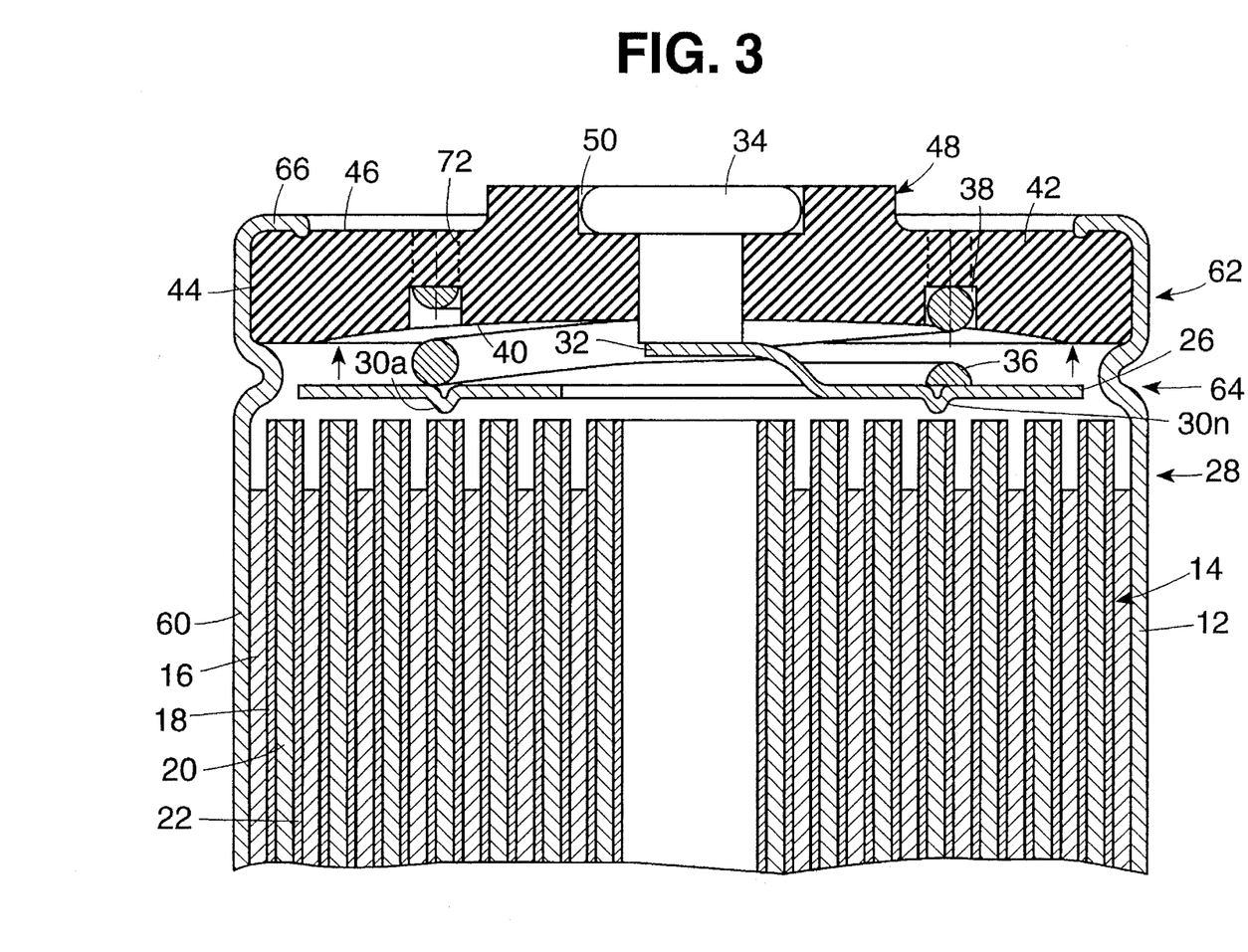
FIG. 3 is a view of the top region of the cell of FIG. 1 showing the positive current collector disengaged from the positive electrode.

FIG. 3 illustrates the cell 10 of FIG. 2 where the positive current collector 26 has disengaged from the positive electrode 20 where all numerals correspond to those elements previously described. Internal gas pressures have caused the positive current collector 26 to move upwardly to physically and electrically disengage the positive electrode 20 from the positive current collector 26, thus interrupting current flow through the battery to act as a circuit breaker or interrupter. Subsequent to battery cool-down or other undesirable occurrences and after reduction of internal pressures, the spring 36 repositions the positive current collector 26 for re-engagement with the positive electrode 20 so that battery operation may once again continue operation.

Figure 4:
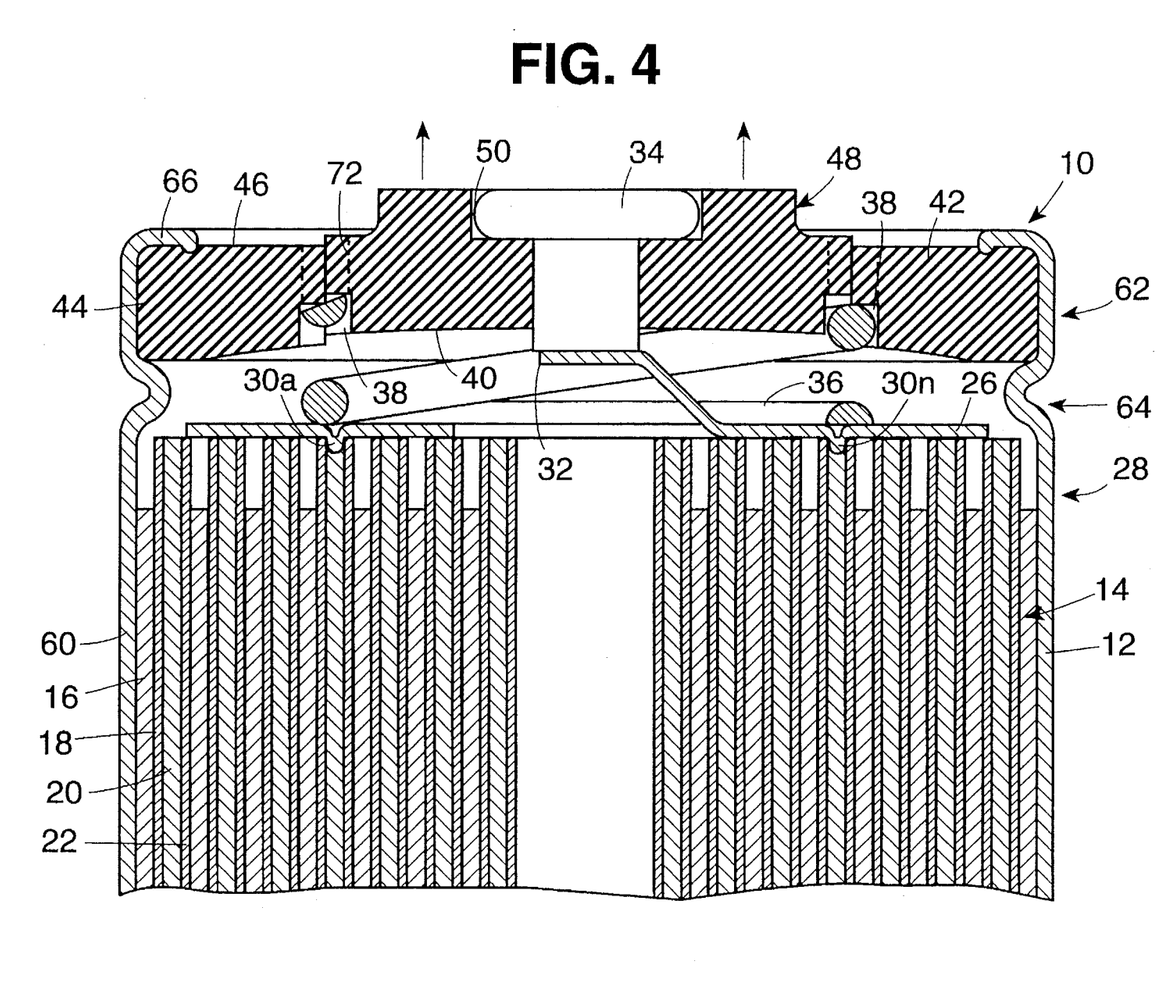
FIG. 4 is a view of the top region of the cell of FIG. 1 showing where the frangible cover has disengaged itself from the main body of the cell.

FIG. 4 illustrates the cell 10 of FIG. 2 where the center frangible section 48 has separated and where all numerals correspond to those elements previously described. High internal anomalies causing excessive pressures have caused the frangible thin area 72 to separate, thus allowing the frangible center section 48 to move generally in an upward direction allowing any built-up pressures to escape the case 12 interior. Though the frangible area 72 is illustrated as a wide band above the annular groove 38, breakage can occur anywhere in the frangible area 72, as illustrated. The breakage can occur in either a small or large arcual path about the frangible area 72 to let internal pressures bleed off. It is appreciated that these internal pressures can cause simultaneous movement of the positive current collector 26 as previously described and of the frangible center section 48 in concert to act as dual safety functions.

Figure 5:
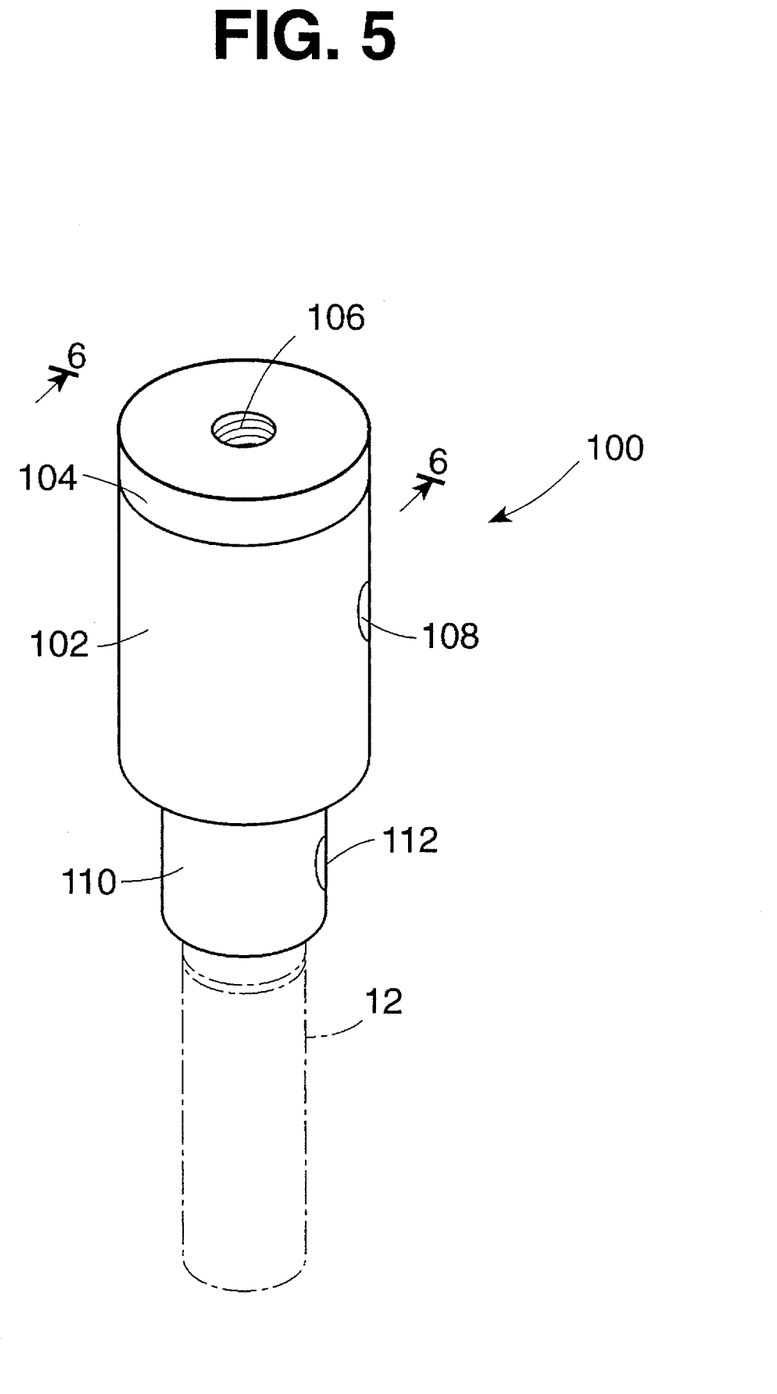
FIG. 5 is an isometric view of a filling fixture in conjunction with a battery cell.

FIG. 5 is an isometric view of a filling fixture 100 which comprises one component for filling and sealing of a battery casing 12 of the present invention under a vacuum for creation of a battery whose internal members are subjected to vacuum evacuation and subsequently are vacuum sealed. All numerals correspond to those elements previously described. Vacuum sealing of the battery is desirable in that the explosion-proofing qualities of a battery are greatly enhanced and also that outward leakage of the electrolyte from a sealed vacuum cell is virtually eliminated. Externally exhibited components of the filling fixture 100 include a cylindrical vacuum housing 102, a cylindrical vacuum housing cap 104, a threaded mounting hole 106 central to the vacuum housing cap 104, a vacuum passageway 108 aligned through the cylindrical vacuum housing 102, a spring loaded positionable cylindrically shaped can seal body 110 aligned through the central bottom area of the cylindrical vacuum housing 102 and an electrolyte passageway 112 aligned through the can seal body 110. Battery casing 12 is illustrated in engagement with the lower regions of the can seal body 110.

Figure 6:
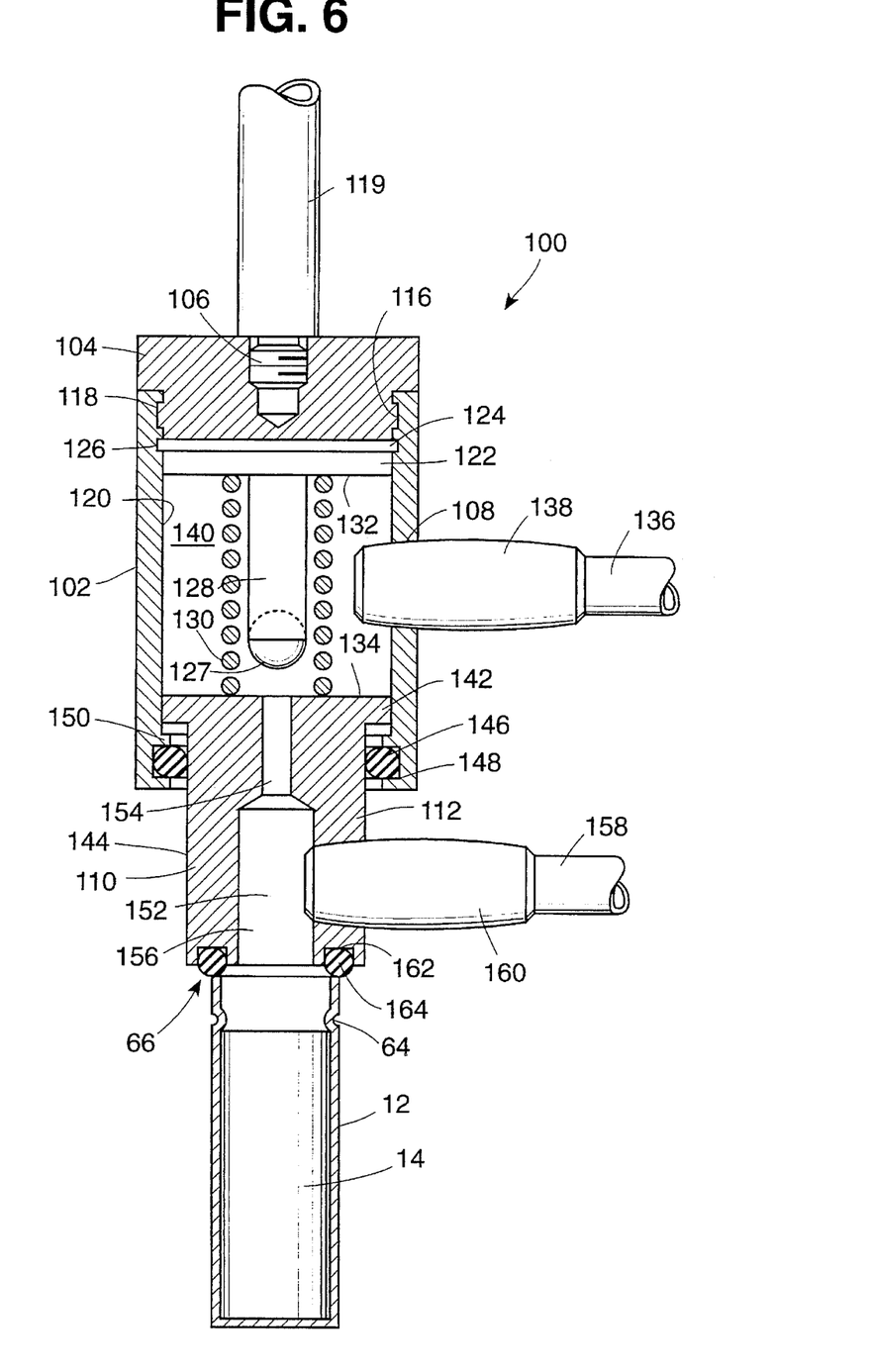
FIG. 6 is a cross sectional view along line 6—6 of FIG. 5.

FIG. 6 is a cross sectional view along line 6—6 of FIG. 5 where all numerals correspond to those elements previously described. Vacuum housing cap 104 includes an annular ring 116 in frictional sealing engagement with an annular groove 118 located on the inner cylindrical surface 120 of the vacuum housing 102. A mounting fixture rod 119 secures in the threaded hole 106 in the vacuum housing cap 104. A valve stem mounting disc 122 includes an annular ring 124 engaging an annular groove 126 located on the inner cylindrical surface 120. A vertically aligned valve stem 128, including a spherical seal 127 secured at its lower end, extends downwardly from the mounting disc 122. A spring 130 aligns over and about the valve stem 128 in alignment between the lower planar surface 132 of the mounting disc 122 and the upper planar surface 134 of the can seal body 110 to position the can seal body 110 in the extended position in the absence of vacuum, as illustrated. A vacuum line 136 and nipple 138 are ported to the vacuum housing interior 140 through vacuum passageway 108. The can seal body 110 includes an annular major radius surface 142, which slidingly aligns to the inner cylindrical surface 120 of the vacuum housing 102, and a minor radius surface 144. An O-ring 146 is located in an annular groove 148, the body of which extends inwardly to form a stop 150 in the lower region of the cylindrical vacuum housing 102. O-ring 146 seals against the minor radius surface 144 of the can seal body 110. A multi-radius continuous passageway 152, including an upper passageway 154 and a lower passageway 156, extends vertically through the can seal body 110. The upper passageway 154 seals against the spherical seal 127 when vacuum is applied through the vacuum line 136 to upwardly position the can seal body 110, as described later in detail. An electrolyte fill line 158 and nipple 160 are ported to the lower passageway 156 through the electrolyte passageway 112. An annular groove 162 at the lower region of the can seal body 110 accommodates an O-ring 164. The O-ring 164 positions against the upper annular surface 66 of the battery casing 12 in a manner which seals the interior of the battery casing 12 containing the electrode assembly 14 to the multi-radius passageway 152 and associated members. As vacuum is increased through vacuum line 136, the can seal body 110 overcomes the pressure of spring 130 and is advanced upwardly into the interior 140 of the cylindrical vacuum housing 102. The vacuum is applied to the cylindrical vacuum housing interior 140, the upper and lower passageways 154 and 156 of the multi-radius passageway 152, the electrolyte passageway 112 and to the interior of the battery casing 12 containing electrode assembly 14. Application of vacuum draws out any air or gases entrapped in the windings of electrode assembly 14. Continued vacuum application draws the can seal body 110 upwardly until the upper passageway 154 seals against the spherical seal 127, as illustrated in FIG. 7.

Figure 7:
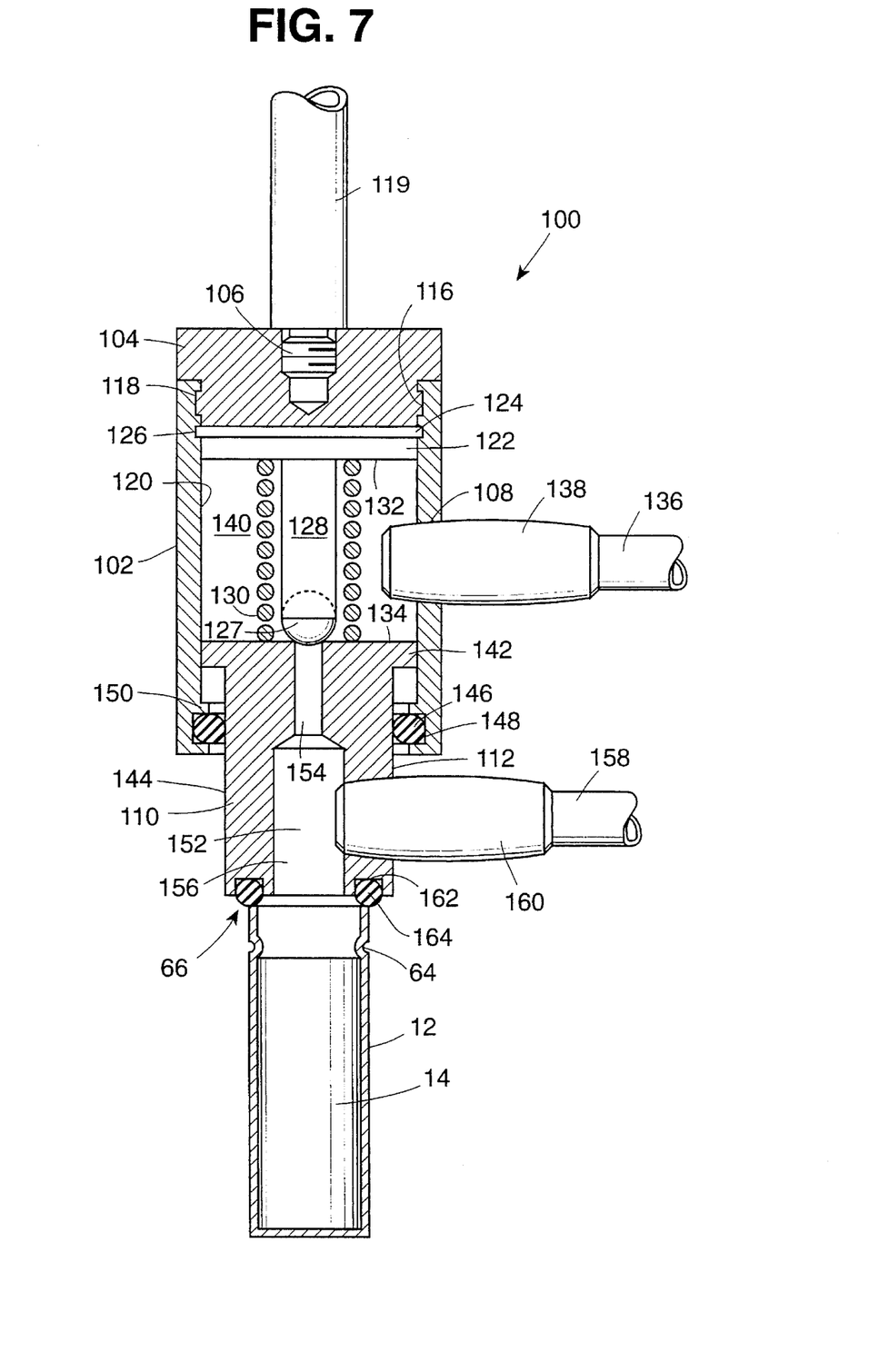
FIG. 7 is a view of the filling fixture and battery cell of FIG. 6 having vacuum applied to the interior of the vacuum housing.

FIG. 7 illustrates the filling fixture 100 of FIG. 6 having vacuum applied to the interior 140 of the cylindrical vacuum housing 102 where all numerals correspond to those elements previously described. As previously described, vacuum is applied to the interior 140 of the cylindrical vacuum housing 102 to cause sealing between the spherical seal 127 and the upper passageway 154. Thus, while sealed, vacuum in the interior area 140 is subject to the vacuum level applied through the vacuum line 136. The vacuum level in the multi-radius passageway 152 and in the interior of the battery casing 12 is held at the level at which the seal between the spherical seal 127 and the upper passageway 154 was effected. Electrolyte is introduced into the multi-radius passageway 152 via the electrolyte fill line 158 and vacuum assisted into the lower pressure area of the multi-radius passageway 152 and into the interior of the battery casing 12 by the existing lower pressure. To summarize, vacuum assists in removal of air pockets from the electrode assembly 14 and aids and assists in vacuum placement of electrolyte into the battery casing 12. Subsequent to electrolyte placement in the battery casing 12, vacuum is released through vacuum line 136 whereby spring 130 assists in returning of the can seal body 110 to the position illustrated in FIG. 6 and the filled battery casing 12 is sealed under vacuum in a battery closing fixture 170 as later described in detail in FIGS. 8, 9 and 10.

Figure 8:
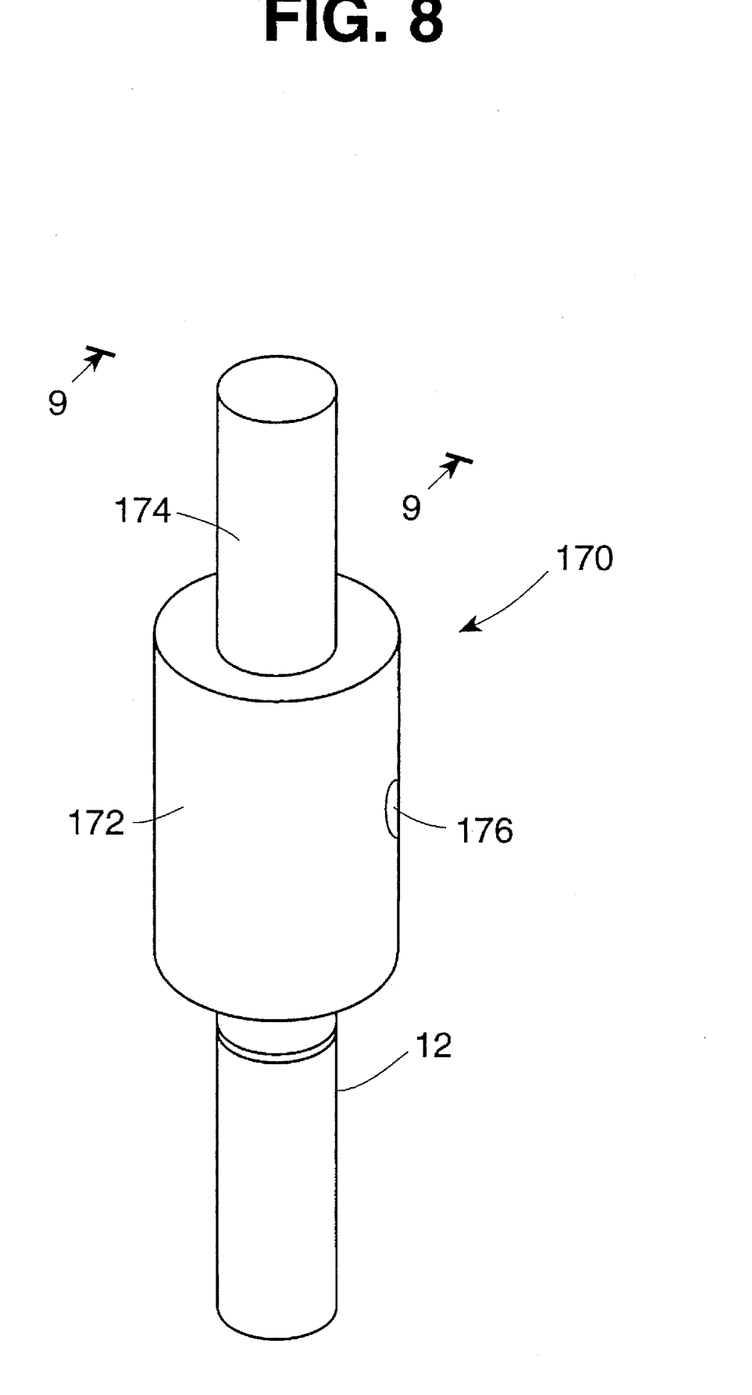
FIG. 8 is an isometric view of a battery closing fixture in conjunction with a battery cell.

FIG. 8 is an isometric view of a battery closing fixture 170 which comprises the other component for filling and sealing of a battery casing 12, where all numerals correspond to those elements previously described. Externally exhibited components of the battery closing fixture 170 include a cylindrical body 172 having a mounting fixture rod 174 extending vertically from the body 172. A vacuum passageway 176 aligns through the cylindrical vacuum body 172.

Figure 9:
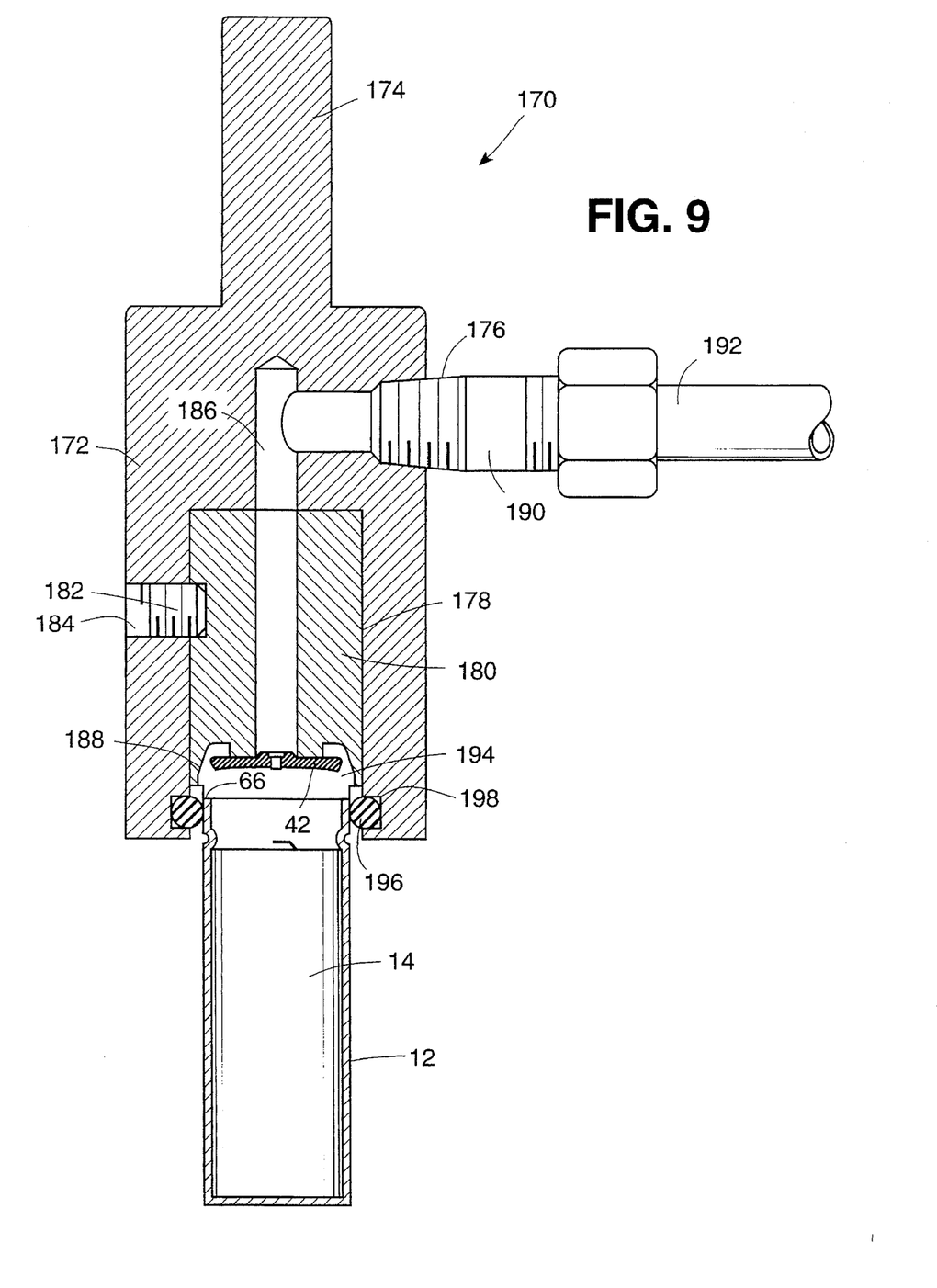
FIG. 9 is a cross sectional view along line 9—9 of FIG. 8.

FIG. 9 is a cross sectional view along line 9—9 of FIG. 8 where all numerals correspond to those elements previously described. Central to the vacuum body 172 is a cylindrical bore 178 which houses a configured cylindrical swaging insert 180 which is secured by a setscrew 182 aligned through a threaded hole 184 in the vacuum body 172. A passageway 186 extends from the center of the vacuum body 172 through the center of the swage insert 180. Swage insert 180 includes an inwardly curved annular swage surface 188 along its lower regions for swage-forming of the upper annular surface 66 over and about the frangible seal cover 42. A nipple 190 and a vacuum line 192 connect to the vacuum passageway 176 to supply vacuum to passageway 186 and thus to the area of the swage surface 188. A cavity 194 aligns below the swage surface 188 between the lower region of the cylindrical bore 178 and an O-ring 196 contained in an annular groove 198 also at the lower region of the cylindrical bore 178. The upper annular edge 66 of the battery casing 12 having electrode assembly 14, electrolyte, and a battery plug 198 are illustrated in partial penetration into cavity 194 and in sealing contact with the O-ring 196. The entire interior of the battery casing 12 and its contents, including the plug 198, which is not yet in full sealing engagement with the interior of the battery casing 12, is subject to vacuum introduced by vacuum line 192 via the passageway 186. The vacuum body 172 is advanced downwardly under vacuum over the upper annular edge 66 of the battery casing 12 to a position illustrated in FIG. 10 where the upper annular edge 66 of the battery casing 12 is swaged by the curved annular swage surface 188 over and about the upper surface of the frangible seal cover 42 to seal the contents of the battery casing 12 under a vacuum to form battery cell 10.

Figure 10:
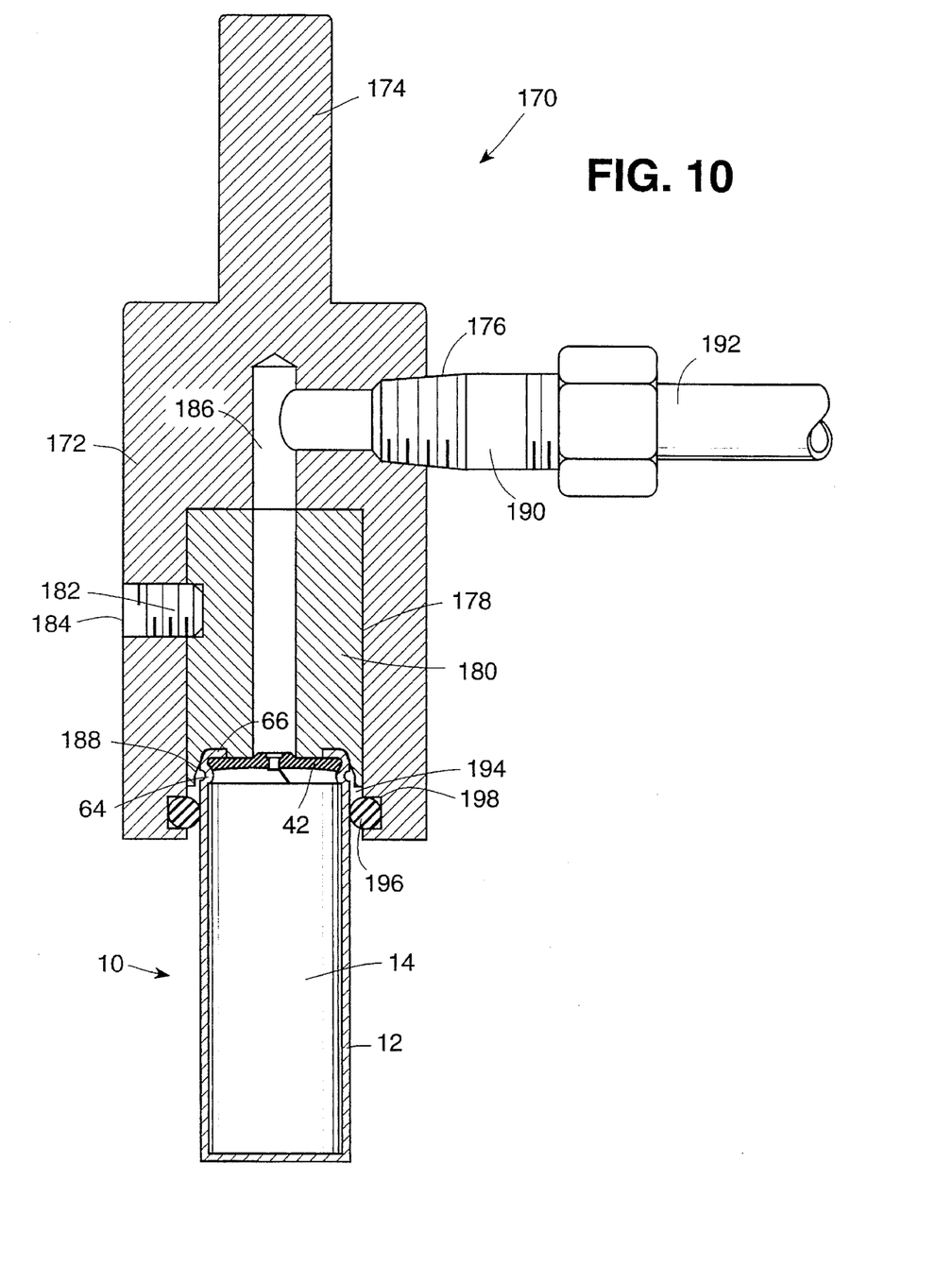
FIG. 10 is a cross sectional view of the battery closing fixture with the battery cell being fully sealed under vacuum.

FIG. 10 illustrates the battery casing 12 being fully sealed while under a vacuum to form cell 10 where all numerals correspond to those elements previously described. Although a casing 12 having an annular sealing groove 64 is illustrated in the preceding embodiments, it can be appreciated that sufficient vertical space is incorporated in the cavity 194 to allow vacuum sealing of either a cell casing having an annular sealing groove 64 or of a cell casing having a wall without an annular sealing groove (an uninterrupted cell wall).

Various modifications can be made to the present invention without departing from the apparent scope hereof.

We claim:

1. A method of sealing and closing an open end of a battery cell casing containing battery components, comprising:
    a. positioning said open end of said battery cell casing in a closing fixture having an evacuation passage and a swage insert;
    b. subjecting said open end of said battery cell casing to a vacuum;
    c. placing a seal into said open end of said battery cell casing;
    d. swaging said battery cell casing over and about said seal; and,
    e. removing said battery cell casing from said closing fixture.

2. A method of filling, sealing and closing a battery cell casing having an open end and an internal electrode assembly, comprising:
    a. positioning said open end of said battery cell casing in contact with a sealing element of a filling fixture;
    b. evacuating said battery cell casing to remove any air and gases entrapped in said electrode assembly;
    c. introducing an electrolyte into said evacuated battery cell casing;
    d. terminating introduction of said electrolyte into said battery cell casing when said battery cell casing becomes filled with electrolyte;
    e. removing said battery cell casing from contact with said sealing element of said filling fixture;
    f. transferring said battery cell casing containing electrolyte to a closing fixture having an evacuation passage and a swage insert;
    g. subjecting said open end of said battery cell casing to a vacuum;
    h. placing a seal into said open end of said battery cell casing;
    i. swaging said battery cell casing over and about said seal; and,
    j. removing said battery cell casing from said closing fixture.

* * * * *

UNITED STATES PATENT AND TRADEMARK OFFICE
CERTIFICATE OF CORRECTION

PATENT No. : 5,588,970

DATED : December 31, 1996

INVENTOR(S): Elmer Hughett and Richard B. Alexandres

It is certified that error appears in the above-identified patent and that said Letters Patent is hereby corrected as shown below:

On the title page, the Abstract should read:

A small battery cell including a pressure relief and spring disengagement device which vents various internal pressures to the atmosphere to prevent cell bulging or explosion, and also which internally interrupts current flow through the cell due to internal cell overheat, excessive current flow or the like. Internal reconnection of cell members reoccurs subsequent to internal thermal or other abnormalities. The battery cell contains an electrolyte which is introduced into the cell casing

UNITED STATES PATENT AND TRADEMARK OFFICE
CERTIFICATE OF CORRECTION

PATENT No. : 5,588,970

DATED : December 31, 1996

INVENTOR(S): Elmer Hughett and Richard B. Alexandres

It is certified that error appears in the above-identified patent and that said Letters Patent is hereby corrected as shown below:

by a method involving the use of apparatus including a filling fixture having an electrolyte fill line and a vacuum line for vacuum assisted filling. Subsequently to filling with the electrolyte, the casing is sealed under vacuum by a battery closing fixture having a vacuum line and a swaging insert for swaging the upper annular surface of the casing over and about a casing cover.--

Column 1, line 20, change "cells" to --cell--;

Column 1, line 59, change "over comes" to --overcomes--;

Column 5, line 57, change "102" to --102,--.

Signed and Sealed this

Twenty-first Day of December, 1999

*Attest:*

Q. TODD DICKINSON

*Attesting Officer*       *Acting Commissioner of Patents and Trademarks*